(12) United States Patent
Dobrowolski et al.

(10) Patent No.: US 6,493,323 B1
(45) Date of Patent: Dec. 10, 2002

(54) ASYNCHRONOUS OBJECT ORIENTED CONFIGURATION CONTROL SYSTEM FOR HIGHLY RELIABLE DISTRIBUTED SYSTEMS

(75) Inventors: Gregory Joseph Dobrowolski, Naperville, IL (US); Kevin Wayne McKiou, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/312,747

(22) Filed: May 14, 1999

(51) Int. Cl.7 .................. H04L 12/46; G06F 15/173
(52) U.S. Cl. .................. 370/254; 370/465; 709/220; 709/223
(58) Field of Search ............................. 370/252, 253, 370/254, 255, 256, 257, 229, 400, 465, 466, 467, 469; 709/220–221, 222, 223, 224, 225, 226, 230, 248, 249, 311

(56) References Cited

U.S. PATENT DOCUMENTS

| | | | | |
|---|---|---|---|---|
| 5,692,123 A | * | 11/1997 | Logghe .......................... 710/1 |
| 6,055,243 A | * | 4/2000 | Vincent et al. ............. 370/466 |
| 6,122,664 A | * | 9/2000 | Boukobza et al. .......... 709/224 |
| 6,247,128 B1 | * | 6/2001 | Fisher et al. .................... 713/1 |
| 6,385,196 B1 | * | 5/2002 | Hayball et al. .............. 370/356 |

* cited by examiner

*Primary Examiner*—Ricky Ngo
(74) *Attorney, Agent, or Firm*—Patton Boggs, LLP

(57) ABSTRACT

The configuration control system is implemented in an environment of multiple hardware platforms and operating systems and can be used to control hardware, software, data and system abstractions. The configuration control system gives the appearance of a unified maintenance environment even though it is controlling hardware and software from many vendors with multiple maintenance environments. It is designed to control the configuration of any system where there are dependencies among subsystems and loss of a subsystem has the potential to interrupt service. The maintenance configuration control protocol unifies Configuration Control to allow any subsystem to communicate with any other subsystem and to the user interface using a common messaging interface. It creates a common state model, relationship model, behavior model and request/response messaging interface for all subsystems whether they are hardware, software, or an abstraction. Furthermore, the maintenance configuration control protocol permits distributed maintenance which is data-driven. That is, it does not depend on a central intelligence to make Configuration Control decisions. Each subsystem is empowered to approve/disapprove a maintenance request and execute it autonomously based on its own data. That data includes its state and its relationships to other subsystems. Because each subsystem is autonomous, it is possible to have many concurrent configuration control requests executing in parallel. Race conditions and conflicts are handled by the common software representing the subsystem.

16 Claims, 6 Drawing Sheets

ASYNCHRONOUS OBJECT ORIENTED CONFIGURATION CONTROL SYSTEM FOR HIGHLY RELIABLE DISTRIBUTED SYSTEMS

FIELD OF THE INVENTION

This invention relates to the configuration control of highly reliable distributed systems and, in particular, to a system for providing asynchronous configuration control of highly reliable, distributed systems, using an object oriented paradigm.

PROBLEM

It is a problem in the field of highly reliable, distributed systems to provide a consistent and easily managed maintenance environment. As the world of highly reliable computing continues to expand with many vendors providing products, it is desirable to combine a number of these highly reliable computing products to implement a more complex system to obtain increased computing power, broader functional scope and physical distribution. The problem with combining off-the-shelf hardware and software into a highly reliable distributed computing system is that none of these products are designed to be combined into a large/complex highly reliable system with other vendor products. Each vendor's product has its own maintenance environment and all of them assume they are under the intelligent control of "someone else". That is, in a system environment, each subsystem has no way of knowing what other system elements are dependent upon that subsystem. Thus, even if a single subsystem is reliable, it is easy to make a mistake during routine maintenance or fault recovery and remove, restore or switch the wrong subsystem bringing the entire system down. The larger and more complex systems become, the more critical this issue of subsystem interaction becomes.

Coordination of maintenance activities (e.g., removal or restoral of units) is typically the job of the Configuration Control component of the system. Configuration Control assures that inter-subsystem dependencies are taken into account when reconfiguring the system to perform maintenance or recover a faulty unit. Typically, even in systems which are wholly developed by a single vendor, the Configuration Control is fractured along some functional boundaries. When this is done, inevitably each function has its own notion of subsystem states, request interfaces, behavior and control hierarchy. Furthermore, systems are almost always centrally controlled. So, if the central control is lost, maintenance operations in the individual subsystems must be halted.

Making these disparate subsystems in a complex system communicate with each other to coordinate activities and communicate with a user interface is exceedingly challenging and expensive. Since each subsystem has its own view of state, behavior, relationships, and request interfaces, there is no standard protocol for one subsystem to establish a relationship and request services of another subsystem. Each interface is a custom development and therefore, any change affecting these interfaces causes major coordination headaches. The software which controls these subsystems is typically developed with an assumed configuration and behavior. That is, the subsystem configuration and its response to a maintenance stimulus is hard-coded. Changing a system comprising a plurality of individual subsystems is very costly and usually entails years of work. Consequently, technological evolution is impeded because it is expensive and takes a long time.

The prior art solution to these problems is to write custom Configuration Control software for every subsystem in the system. It is common to have multiple notions of state, dissimilar request interfaces and hardcoded relationships and behavior. Every piece of configuration control code is custom made. Consequently, the same algorithms which are common to all Configuration Control are implemented and reimplemented over and over, each time with changes introduced by the present developer. Control is centralized with, typically, only one maintenance request allowed to execute at any one time.

Typical high-reliability systems such as a telecommunications switch have about 80% of their cost sunk into maintenance software, of which Configuration Control is a major and key part. In the typical system where infrastructure is already in place, Configuration Control software may account for as much as 30%–50% of the cost of adding a new subsystem element. It has been estimated that from 50%–80% of the cost of writing Configuration Control software can be eliminated and development intervals reduced by using a standardized approach. This provides the potential commercial benefits of reduced product development cost and reduced product development intervals. The standardized Configuration Control protocol could be integrated into network management products to produce very intelligent network element behavior. In addition, a commercial version of the standardized Configuration Control protocol could be packaged and sold to vendors of highly reliable products and network management products. However, to date there is no standardized Configuration Control protocol.

SOLUTION

The above described problems are solved and a technical advance achieved by the system for providing asynchronous configuration control of highly reliable distributed systems using an object oriented paradigm (termed "configuration control system" herein). In this configuration control system, the maintenance configuration control protocol is implemented in an environment of multiple hardware platforms and operating systems and can be used to control hardware, software, data and system abstractions. The configuration control system gives the appearance of a unified maintenance environment even though it is controlling hardware and software from many vendors with multiple maintenance environments. The configuration control system works equally well for an embedded subsystem, a distributed switching system or a network of processors. It is designed to control the configuration of any system where there are dependencies among subsystems and loss of a subsystem has the potential to interrupt service.

The maintenance configuration control protocol developed unifies Configuration Control to allow any subsystem to communicate with any other subsystem and to the user interface using a common messaging interface. It creates a common state model, relationship model, behavior model and request/response messaging interface for all subsystems whether they are hardware, software, or an abstraction. Furthermore, the maintenance configuration control protocol permits distributed maintenance which is data-driven. That is, it does not depend on a central intelligence to make Configuration Control decisions. Each subsystem is empowered to approve/disapprove a maintenance request and execute it autonomously based on its own data. That data includes its state and its relationships to other subsystems. Because each subsystem is autonomous, it is possible to have many concurrent configuration control requests executing in parallel. Race conditions and conflicts are handled by the common software representing the subsystem. A coordinating entity (a Maintenance Request Administrator) is not a requirement.

The maintenance configuration control protocol standardizes the state, communication interfaces, relationships and behavior. Further, the relationships are captured in data which can be changed in a running system. Thus, Configuration Control behavior can be changed on-the-fly. Configuration Control is distributed so there is no dependency on a central processing elements and multiple maintenance requests may execute simultaneously.

The problems which this configuration control system solves are:

Coordination of dissimilar (different vendors, multiple platforms and maintenance systems) subsystem configuration changes during a maintenance request (remove, restore, switch) to assure service continuity.

Dependency on one system coordinating entity which creates a bottleneck and restricts concurrency.

Creating interfaces and dependencies between subsystems which have different notions of state, relationships, behavior and request interfaces.

Complex hard-coded Configuration Control logic which is expensive to change/evolve, impeding technological evolution.

Thus, the configuration control system provides asynchronous configuration control of highly reliable distributed systems using an object oriented paradigm. The configuration control system gives the appearance of a unified maintenance environment even though it is controlling hardware and software from many vendors with multiple maintenance environments.

DETAILED DESCRIPTION

Figure 1:
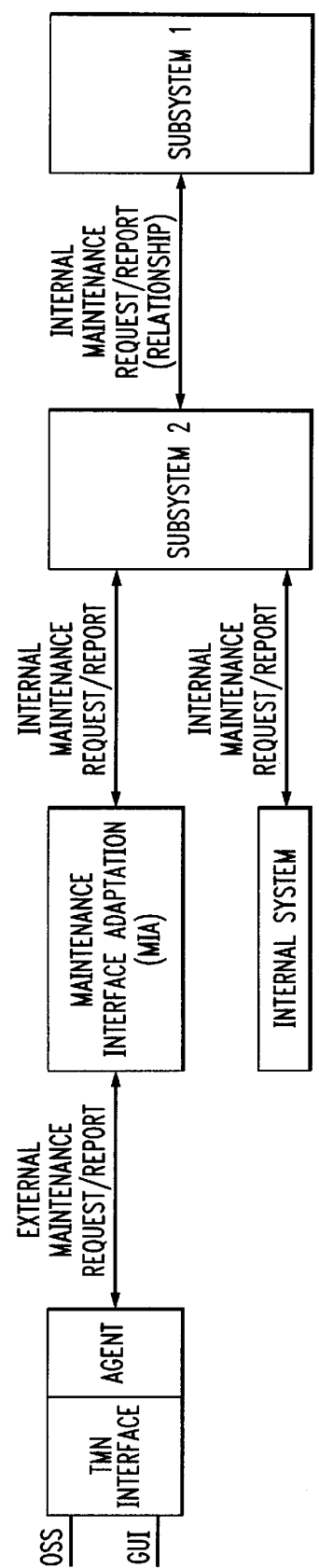
FIG. 1 illustrates in block diagram form the overall concept of the configuration control system.
Figure 2:
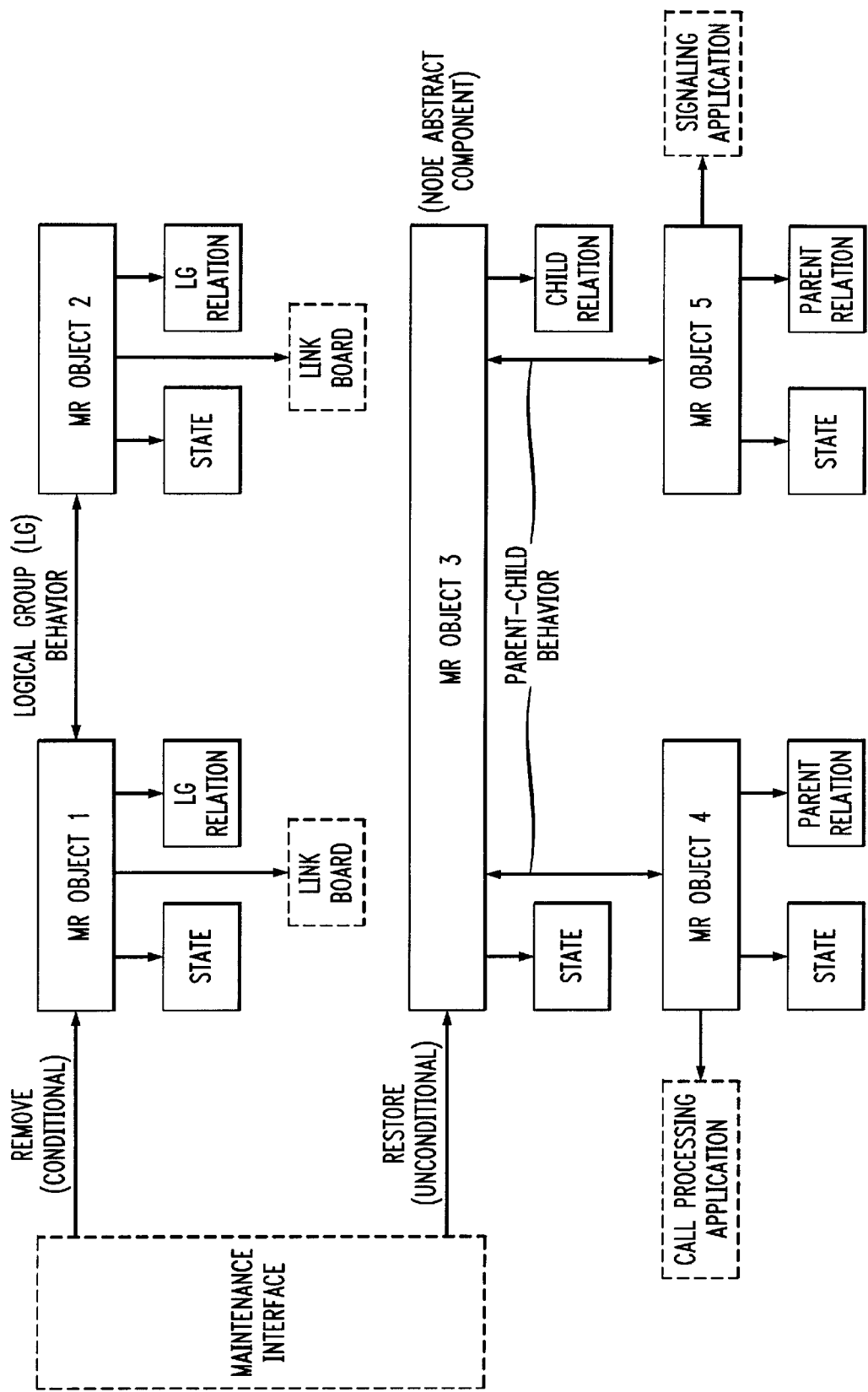
FIG. 2 illustrates in block diagram form the overall concept of the configuration control system where a configuration control interface is created for each subsystem to provide a common maintenance request interface.

The maintenance architecture of the configuration control system is shown in FIG. 1. The Operations Support System and Graphical User Interface are connected to the Telecommunications Management Network Interface, and requests are initiated from this external interface and are passed to the internal Maintenance Interface Adaptation and thence to the designated subsystem(s) for execution. The Maintainable Resource (object framework implementation of this protocol) is a portion of each subsystem which provides the maintenance capabilities. The primary function of the Maintenance Interface Adaptation is to translate the request received from an application interface and route the request to the appropriate subsystem, assuring that processing of the request is completed, and then report the result to the requesting application. FIG. 2 illustrates in block diagram form the overall concept of the present configuration control system, wherein a configuration control interface (Maintainable Resource object) is created for each subsystem, which configuration control interface provides a common maintenance request interface, state model and behavior. The Maintainable Resource framework provides the context for doing the common and repetitive activities associated with maintaining a multi-subsystem system. The Maintainable Resource provides interfaces to the underlying resources for the other system frameworks (Fault Management, Alarms, Testing, and the like). Maintenance is responsible for adding, deleting, setting/reporting the maintenance state of subsystems. A Maintainable Resource is a component which can be grown or degrown from the system, has states representing its operational condition and can be transitioned through its states.

The Maintainable Resource provides the subsystem interface for requesting maintenance state changes and retrieving the subsystem state. The description of the Maintainable Resource can be partitioned into three major areas:

1. Maintenance states which represent the presence and operational condition of a subsystem.
2. Actions (request interfaces) which initiate the transitions through subsystem states.
3. Relationships which define how the Maintainable Resources interact with each other.

These partitions are described in detail below.

Description of Protocol Implementation (Maintainable Resource Class)

The present implementation of the protocol is with a C++ class called Maintainable Resource (MR). Objects that are derived from the Maintainable Resource class are used to represent each subsystem in the system. Since all subsystems have a common state model, relationship model, behavior model and communication (messaging) interface, integrating a new subsystem into the system is straightforward. An instance of the Maintainable Resource class is created which is customized to the requirements of the new subsystem (e.g., disk, line card, CCS7 Signaling application, etc.), several examples of which are shown in FIG. 2.

Customization is accomplished in a couple of ways. First, since Maintainable Resource is a C++ class, it may be inherited and specialized functions added. Second, virtual functions (hooks) are provided in the Maintainable Resource class which are overwritten by the subsystem developer to interface to the real underlying system resource. Thus, even though the derived Maintainable Resource-based objects may reside in different maintenance environments, that fact is hidden behind the interface and behavior provided by the Maintainable Resource class. All Maintainable Resource class objects know how to talk with each other and request services of other Maintainable Resource class objects. Thus, when a new subsystem and its Maintainable Resource based Configuration Control interface are added to the system, it will behave as an integral part of the system.

Though the initial implementation of these concepts is using an object-oriented language (C++), the same concepts can also be implemented with a non-object-oriented language (e.g.,C). The difference is only in the low level implementation. The principles would remain the same. There are still subsystems, they would have their own state and relationship data, subsystem-to-subsystem communication occurs through messages, and each subsystem would be empowered to make its own decisions (autonomous) and take action (behavior) on reconfiguration requests. Customization is accomplished through function pointer tables instead of inheritance and virtual functions. This is a very important point because products can mix C and C++ environments. To get the full benefit of these concepts, the principles must apply across both environments. The state, relationship, communication and behavior models are exactly the same regardless of the development environment. The following subsections highlight some specifics of the Configuration Control protocol concepts.

Standard Maintenance Subsystems

Standard maintenance subsystems have been "manufactured" which include all the standard relationships, states, communication/maintenance request interfaces and state-change behavior. Creating maintenance code for a system has been reduced to stamping out "cookie-cutter" subsystems which are specialized with relationship data and overwriting a limited set of virtual functions associated with state changes. These subsystems may be "dropped" anywhere in the system that supports the communications system and utilities (timers, Finite State Machines and such) and they will behave according to the rules defined by their relationships. They may even be moved from one processor to another and they will continue to interact correctly. Each subsystem has its own identity/logical address for messaging. So, subsystems need not know the physical location of other subsystems they want to communicate with. They only need to know the identity. Messages will be correctly routed. The success of this approach to simplifying maintenance code is dependent upon standardizing the relationships, states, behavior and communication (maintenance request/reply) interfaces.

Explicit Standard Subsystem Maintenance Relationships

Explicit standard subsystem maintenance relationships result in specific behavior during a maintenance request (remove, restore or switch) as shown in FIG. 2. These standard subsystem maintenance relationships are:

Parent is a subsystem upon which another subsystem (its Child) is dependent for its operation.

Child is a subsystem which is dependent upon another subsystem (its Parent) for its operation.

Logical Group is a group of like subsystems that provide some functionality as a group. The group has a minimum number of members which must normally remain active.

Sparing Group is a set of like subsystems that provide some functionality as a group. The group has a maximum number of members which may normally be active. Note: Putting two like subsystems in a Logical Group and a Sparing Group setting the Min =Max=1 creates an Active-Standby "Mate" relationship.

Virtual Group is a group of like subsystems that provide functionality as a group. The state of the group is reflected through an Agent. Dependencies on the group are expressed as dependencies on the Agent.

Physical Group is a heterogeneous set of subsystems which depend on each other to provide service. If one group member is Active/Standby/OOS all must be Active/Standby/OOS.

In past developments these relationships have been implied rather than explicit. Maintenance code development in the past has been developed with the behavior associated with these relationships hard-coded into programs. Traditionally, the code would be developed for one subsystem and then "cut and pasted" to develop the same relationship for another subsystem. Along the way changes would be made which slightly (or grossly) changed the behavior from subsystem to subsystem. The result has been an ad hoc body of code that has no way of interworking without developing a significant body of custom (again ad hoc) interworking code. Creating explicit standard relationships allows full reuse of the behavior associated with the relationship, predictable and easy interworking of subsystem maintenance behavior. No custom interworking code is required.

Standard Subsystem Behavior

Standard subsystem relationships drive standard maintenance behavior. Explicit relationships would be of no value if there were not standard (predictable) behavior which resulted from them. It would be impossible for one subsystem to request services of another subsystem (for example, one subsystem can request another to restore itself to service) if there was not a precise definition of the actions to be taken, state changes and messages exchanged.

Standard Subsystem Maintenance States

Standard subsystem maintenance states permits one to accurately determine the status of a subsystem and reliably predict the behavior when a state change is requested via the communication/maintenance request interfaces. The set of states associated with the standard subsystem is unique in highly reliable systems. Because maintenance code is developed in "islands" called subsystems and then interconnected, each subsystem has its own notion of the state of the subsystems in that subsystem. This turns out to be a subjective choice of states which ends up being very ad hoc. The strong tendency is to expand the state model of a subsystem to include many, often orthogonal, disciplines rather than properly layer the states. It is very common to find state models which include the operational state, diagnostic state, fault state, alarm state and application-related states. This causes tremendous complication and confusion. Furthermore, it makes interworking of one subsystem with another based on state nearly impossible. The standard subsystem state model defines the operational state only. All subsystems share the standard set of states and have a common understanding of the operational status of other subsystems. This forces states for other disciplines to be built on top of the operational state. For example, when a diagnostic must be run on a subsystem, the diagnostic program would be written to request the subsystem to be removed from service. A standard state is provided which marks the subsystem as having been removed from service by an "automatic" or system element (diagnostics in this case). The state of diagnostics is then maintained by diagnostics, not the standard subsystem. The subsystem only knows that it has been removed from service by a system element. It does not know or care that it was diagnostics.

Figure 3:
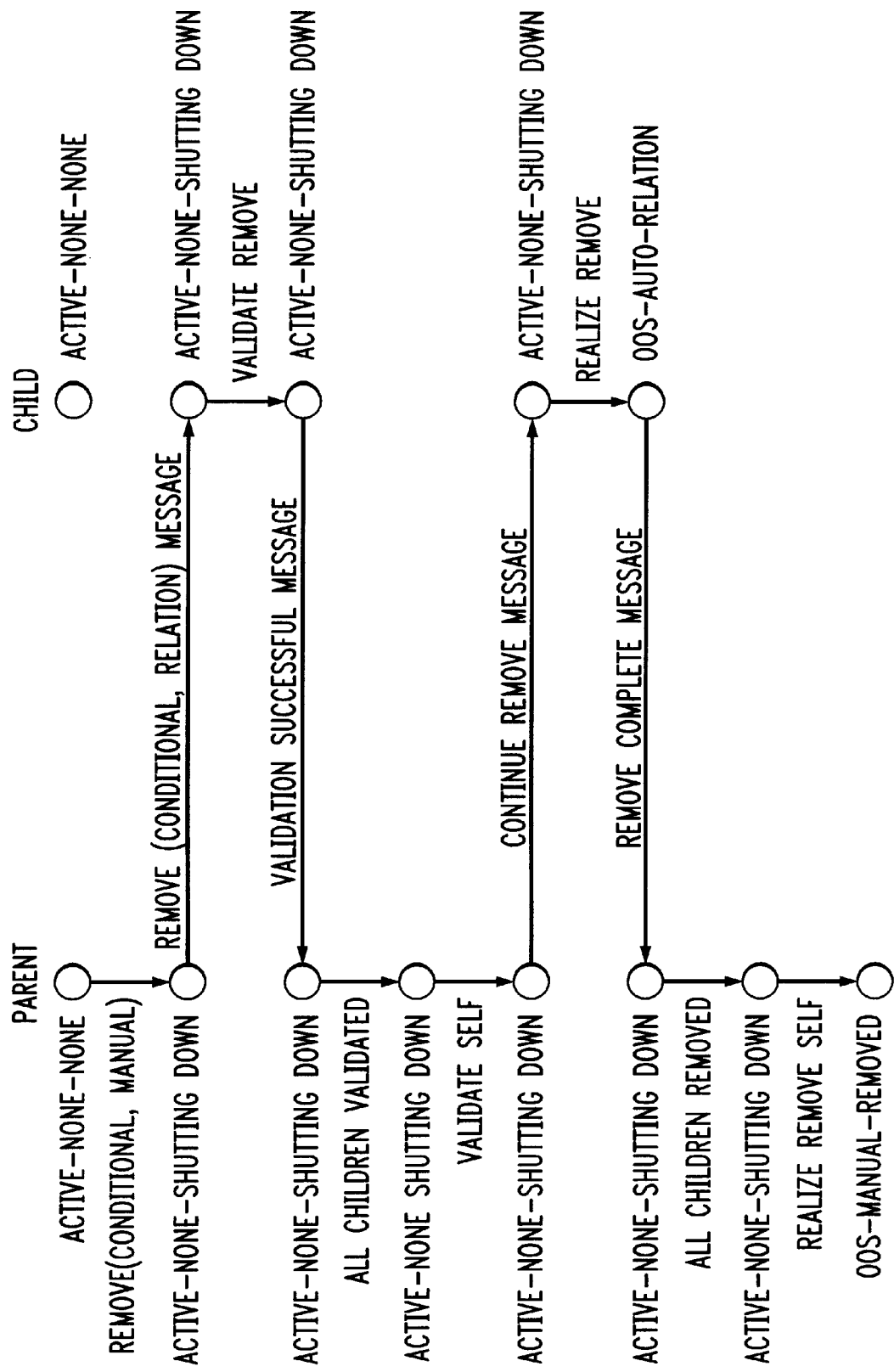
FIG. 3 illustrates in flow diagram form the operation of a typical process in the configuration control system.

The common state model is based on the MML standard and has been simplified to generalize configuration Control functions. Extensions were added to allow distributed asynchronous concurrent processing of configuration requests. Subsystem states as shown in FIG. 3 include:

Active-None-None
Active-None-Degraded
Active-None-Shutting Down
Active-None-Going Standby Standby-None-None
Standby-None-Degraded
Standby-None-Shutting Down
Standby-None-Going Active
OOS-Auto-Fault
OOS-Auto-Relation
OOS-Auto-Removed
OOS-Auto-Trouble
OOS-Manual-Removed
OOS-None-initializing
Growth-None-Fault
Growth-None-None
Unequipped-None-None This common state model allows one subsystem to query other subsystems and, based on their state, make decisions about requested changes to its own configuration. It also unifies the interface to the craft interface or other control interface (e.g., a TMN standard control interface).

Standard Subsystem Communication/Maintenance Request Interfaces

Standard maintenance relationships are stored as data and may be updated in a running system. A subsystem checks its relationships before executing a maintenance request. Thus, it always has the latest view of its relationships. Updates to the relationship data may be made at any time in a running system changing the maintenance behavior of any subsystem. This gives designers, administrators, developers and field support a great deal of freedom to reconfigure the system, add and delete subsystems without any code rewrite or a reboot of the system. Up-time and flexibility are maximized.

Standard subsystem communication/maintenance request interfaces allow any subsystem to communicate with any other without translation by interworking code. The standard subsystem has a communication/maintenance request interface which is the same across all subsystems. The request to remove, restore, switch or just get the state of another subsystem is always the same as is the reply. All requests and replies are in message format with a well known structure. This makes interworking of subsystems trivial at the level of operational state control. This standard request /response interface across subsystems is unique in highly reliable or (especially) large systems since the systems are fractured along subsystem boundaries.

All subsystem Configuration Control request interfaces are standardized on a common messaging system. Request and Response Messages are provided to perform the following actions on subsystems:

Remove (from service)
Restore (to service)
Switch (from Active/Standby)
Promote (from Standby to Active)
Demote (from Active to Standby)
Reset
Degrade (set or clear)
Degrow (from Growth to Unequipped)
Activate (from Growth to OOS)
Deactivate (from OOS to Growth)
Abort (configuration control request)
Check state (verify state of underlying system resource)
Read state (read the present recorded state)
Hook Reply (asynchronous function return mechanism)

Each operation is handled asynchronously. A request is received by the subsystem and execution proceeds until it is necessary for external (to the subsystem) communication. The external request is made (via message or through a virtual function call). The subsystem then relinquishes execution control allowing other subsystems to receive requests/responses. Upon receipt of a response, execution resumes within the subsystem until external communication is again required. This pattern repeats until the configuration request is completed.

Standard Subsystems Implement the Same Behavior

Figure 6:
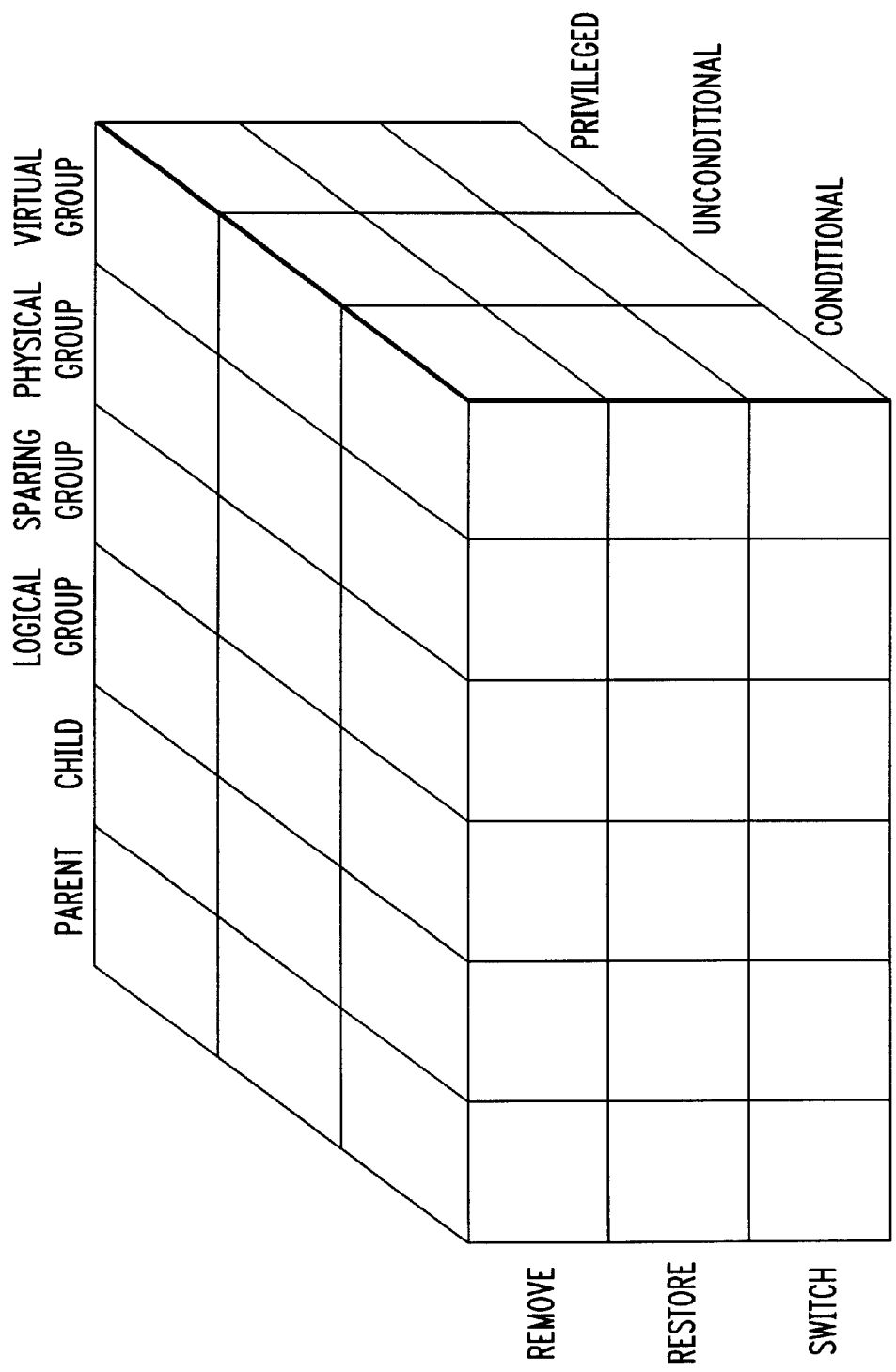
FIG. 6 illustrates a set of combinations of components (standard subsystem maintenance relationships) in the form of a "cube" which represents a typical protocol that has been implemented.

Standard subsystems implement the same behavior (protocol) when transitioning from one state to another. All subsystems follow the same protocol when requested to transit from operational state to another. Each [message type—request type] combination invokes a specific behavior for each of the possible relationships which a subsystem may have. The combinations can be thought of in 3 dimensions as illustrated in FIG. 6 thus:

Each "cube" represents a protocol that has been implemented. The protocol is defined externally by an exchange of messages. Internally (within the subsystem), it is series of state transitions which walk the subsystem through all the operations needed to successfully transition (or not) from one operational state to another.

Behavior

The bulk of the work in creating the Configuration Control protocol is in defining the state change behavior. It is not possible to go into much detail in this description but an example of standard behavior is illustrated with the Parent and Child relationships. If a subsystem has other subsystems listed in its Child relationship data, they are said to be children and it is the Parent. When the Parent receives a request to Remove itself from service, it must first remove its children from service because they are dependent on it for their operation. The Parent requests each Child to validate that it can be removed. If all children respond with a positive acknowledgment, the Parent then directs the children to execute their removal from service. After all the children have removed themselves from service, the Parent executes its own removal from service and the Remove configuration request is completed. This behavior is illustrated in FIG. 3.

Maintenance Policies Are Fully Distributed to the Subsystems

Figure 4:
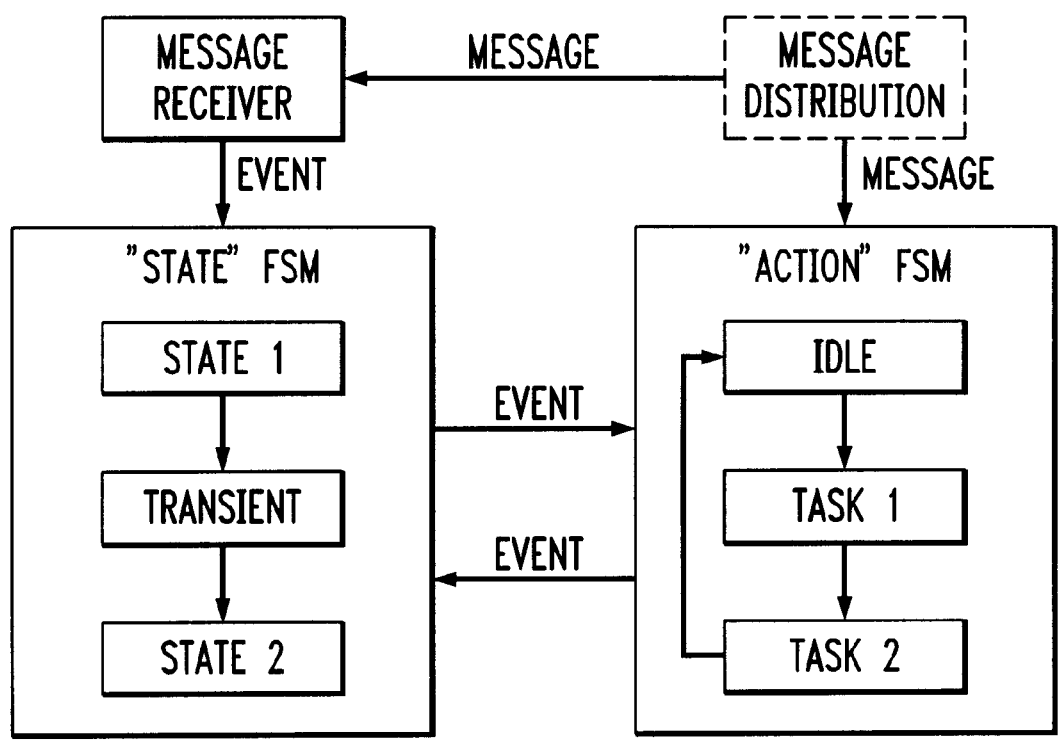
FIG. 4 illustrates in block diagram form a typical asynchronous behavior in the distribution of messages in the configuration control system.
Figure 5:
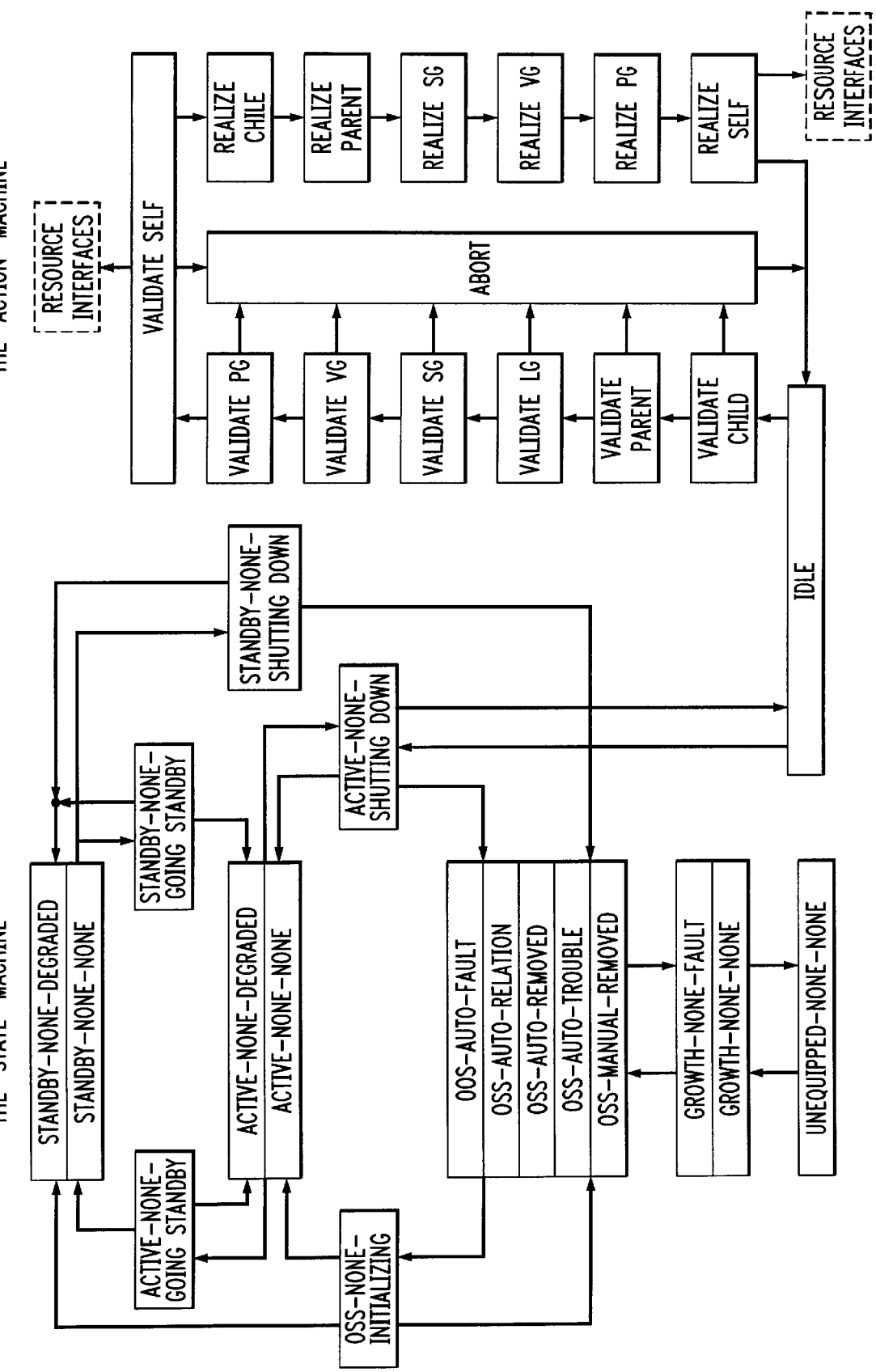
FIG. 5 illustrates in block diagram form a typical implementation of the software for the configuration control system in the form of cooperating finite state machines, including a "state" machine and an "action" machine.

Each subsystem is an independent and intelligent entity. It makes its own decisions, accepting or rejecting maintenance requests and taking charge of execution. There is no dependency on a centralized control. Subsystems may be moved from machine to machine. Massively parallel maintenance activities may occur. Work can be shared across multiple processors. FIG. 5 illustrates in block diagram form a typical implementation of the software for the present configuration control system in the form of cooperating finite state machines, including a "state" machine and an "action" machine, FIG. 4 illustrates in block diagram form a typical asynchronous behavior in the distribution of messages in the resent configuration control system; and FIG. 3 illustrates in flow diagram form the operation of a typical process in the present configuration control system.

The message passing behavior of the Maintainable Resource is illustrated in these figures, which also indicate the asynchronous behavior which allows processing to continue while the Maintainable Resource is executing a maintenance request. This behavior is implemented using the finite state machine portion of the configuration control system. The finite state machine is used to control the execution of tasks through the Maintainable Resource as well as the externally visible state changes. Each time the Maintainable Resource receives a message through a message handler, a function corresponding to that message type is called which gathers the needed information and activates the finite state machine. The finite state machine uses the present state of the task as well as the information provided in the most recent message to determine the correct action to take next. The result of this determination is passed to the action finite state machine to implement. Once the action or task execution is completed, the action finite state machine passes event information back to the state finite state machine which function as a stimulus to move the state finite state machine forward until the overall task is completed.

Summary

Since the state model, request/messaging interface, relationship data and behavior are standardized, adding a new subsystem or even subsystems to a system is greatly simplified. A new software subsystem which represents the real subsystem is created. A standard set of functions are written which interface the software subsystem to the real subsystem. Site data is added which creates the relationships between the new subsystem and the existing subsystems.

What is claimed:

1. A method of operating a configuration control system for presenting a unified maintenance environment in an environment comprising a plurality of subsystems which are implemented in at least one of multiple hardware platforms and multiple operating systems, comprising the steps of:

operating a configuration control interface in each of said plurlaity of subsystems, which configuration control interface provides a common maintenance request interface, state model and behavior and operates asynchronously with respect to others of said configuration control interface in each of said plurlaity of subsystems;

assigning each of said plurality of subsystems its own logical address for messaging; and exchanging messages among said configuration control interfaces installed in each of said plurlaity of subsystems.

2. The method of operating a configuration control system of claim 1 wherein said step of operating a configuration control interface comprises:

providing an interface to the underlying resources for other frameworks contained in said plurality of subsystems.

3. The method of operating a configuration control system of claim 2 wherein said step of operating a configuration control interface further comprises:

performing the steps of adding, deleting, setting, reporting the maintenance state of an associated one of said plurality of subsystems.

4. The method of operating a configuration control system of claim 3 wherein said step of performing comprises:

determining maintenance states which represent the presence and operational condition of said associated one of said plurality of subsystems.

5. The method of operating a configuration control system of claim 3 wherein said step of performing comprises:

implementing actions to initiate the transitions through a plurlaity of states of said associated one of said plurality of subsystems.

6. The method of operating a configuration control system of claim 3 wherein said step of performing comprises:

implementing relationships to define how said configuration control interface in each of said plurlaity of subsystems interact with each other.

7. The method of operating a configuration control system of claim 3 wherein said step of performing comprises:

executing a plurality of concurrent configuration control requests in parallel.

8. The method of operating a configuration control system of claim 2 wherein said step of providing an interface comprises:

creating interfaces and dependencies between subsystems which have different notions of state, relationships, behavior and request interfaces.

9. A configuration control system for presenting a unified maintenance environment in an environment comprising a plurality of subsystems which are implemented in at least one of multiple hardware platforms and multiple operating systems, comprising:

configuration control interface means, located in each of said plurlaity of subsystems, which configuration control interface means provides a common maintenance request interface, state model and behavior and operates asynchronously with respect to others of said configuration control interface in each of said plurlaity of subsystems;

means for assigning each of said plurality of subsystems its own logical address for messaging; and means for exchanging messages among said configuration control interface means installed in each of said plurlaity of subsystems.

10. The configuration control system of claim 9 wherein said configuration control interface means comprises:

means for providing an interface to the underlying resources for other frameworks contained in said plurality of subsystems.

11. The configuration control system of claim 10 wherein said configuration control interface means further comprises:

means for performing the steps of adding, deleting, setting, reporting the maintenance state of an associated one of said plurality of subsystems.

12. The configuration control system of claim 11 wherein said means for performing comprises:

means for determining maintenance states which represent the presence and operational condition of said associated one of said plurality of subsystems.

13. The configuration control system of claim 11 wherein said means for performing comprises:

means for implementing actions to initiate the transitions through a plurlaity of states of said associated one of said plurality of subsystems.

14. The configuration control system of claim 11 wherein said means for performing comprises:

means for implementing relationships to define how said configuration control interface in each of said plurlaity of subsystems interact with each other.

15. The configuration control system of claim 11 wherein said means for performing comprises:

means for executing a plurality of concurrent configuration control requests in parallel.

16. The configuration control system of claim 10 wherein said means for providing an interface comprises:

means for creating interfaces and dependencies between subsystems which have different notions of state, relationships, behavior and request interfaces.

* * * * *